Jan. 31, 1928.
T. CARLSEN
WEEDER
Filed May 18, 1926
1,657,456
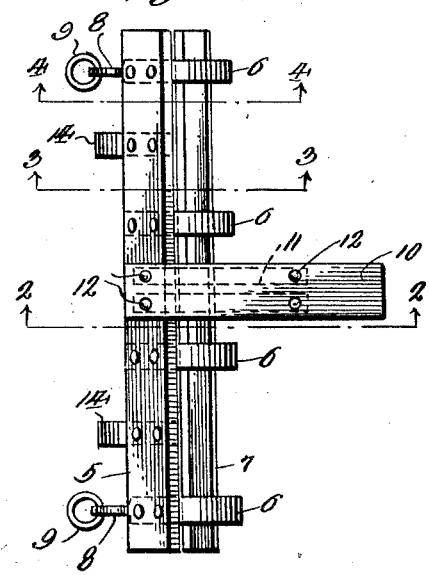
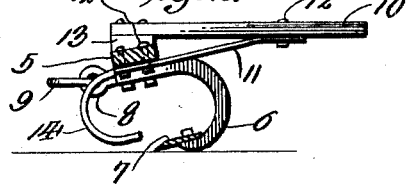
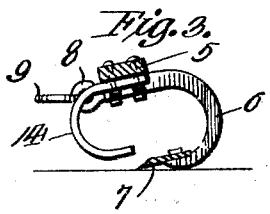
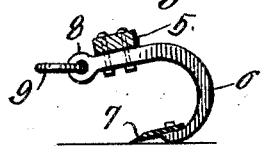
Inventor
THURVAL CARLSEN Patented Jan. 31, 1928.

1,657,456

UNITED STATES PATENT OFFICE.

THURVAL CARLSEN, OF MALAD, IDAHO.

WEEDER.

Application filed May 18, 1926. Serial No. 110,000.

This invention relates to certain new and useful improvements in weeders, and has more particular reference to a weeder of the type embodying a blade adapted to be drawn beneath the surface of the soil for severing the stalks of the weeds.

The primary object of the present invention is to provide a weeder of the above kind which is extremely simple and durable in construction as well as efficient in operation.

A further object is to provide simple and effective means for facilitating regulation of the depth at which the blade is allowed to pass beneath the surface of the soil when the weeder is in use.

Another object is to provide a weeder having ground engaging shoes upon which the weeder may be bodily forwardly rolled for causing dis-engagement of the blade from the soil and positioning of the blade at an elevation whereby cleaning of said blade is facilitated when the same becomes clogged during use of the weeder.

Other objects will become apparent as the nature of the invention is better understood, and the same consists in the novel form, combination and arrangement of parts hereinafter more fully described, shown in the accompanying drawing and claimed.

In the drawing, wherein like reference characters indicate corresponding parts throughout the several views, Figure 1 is a top plan view of a weeder constructed in accordance with the present invention;

Figure 2 is a longitudinal section taken upon line 2—2 of Figure 1;

Figure 3 is a similar view taken upon line 3—3 of Figure 1; and

Figure 4 is a section taken upon line 4—4 of Figure 1.

Referring more in detail to the drawing, the present weeder embodies the equivalent of a frame preferably in the nature of a transverse beam 5. Rigid with and depending from the beam 5 are a plurality of substantially J-shaped standards 6 which are arranged in side by side spaced relation and have a transverse weeding blade 7 rigidly secured across the bill ends thereof. The shanks of the standards 6 are secured across the underside of the transverse beam 5 so that said standards project rearwardly and downwardly. The shorter forwardly projecting lower ends of the standards 6 are disposed so that when the blade 7 is secured thereto, said blade is disposed parallel with the beam 5 with said beam slightly in advance of the blade whereby, upon exerting a forward pull upon the weeder substantially at the forward edge of the beam 5, forward tilting of the weeder bodily about a transverse axis is had for positioning the blade 7 at a forward and downward inclination. In this way the blade naturally tends to pass into and beneath the surface of the soil as the weeder is drawn forwardly whereby the stalks of the weeds will be severed beneath the surface of the soil for effective extermination.

The weeder is adapted to be drawn forwardly by animal or other power, and for facilitating pulling of the weeder the end standards 6 are preferably formed upon their upper ends with forwardly projecting eyes 8 in which are engaged hitching rings 9. In order that the angle of the blade 7 relative to the surface of the soil may be changed from time to time and the depth at which said blade passes beneath the surface of the soil accordingly regulated, I provide a tail board 10 which is rigidly attached to the intermediate portion of the beam 5 so as to project rearwardly from the latter. An attendant may thus stand upon the tail board or platform 10 and by suitable manœuvring and up and down movement thereon may effect backward tilting of the weeder bodily about a transverse axis to a greater or less degree whereby the inclination of the blade 7 may be changed. Obviously, variations in the inclination of the blade will result in changing the depth at which the blade passes beneath the surface of the soil. I have found that a most effective position of the tail board 10 is had when said tail board is attached at its forward end to the beam 5 so that the blade 7 and the tail board are fixed in rearwardly converging relation. In other words, the tail board 10 will be disposed at a rearward and downward inclination when the blade 7 and the beam 5 are disposed horizontally, while, upon operative positioning of the beam 5 and blade 7 at a downward and forward inclination, the tail board 10 will be substantially horizontally disposed as shown in Figure 2. The tail board may be suitably braced as at 11 with respect to the beam 5, such bracing consisting in the provision of a pair of longitudinal bracing bars or strips disposed in side by side relation beneath the beam and the tail board as well as rigidly connected to the beam and the tail board at their ends as indicated at 12. The positioning of the tail board 10 in the relation to the blade 7 as noted above may be conveniently effected by placing a tapered block 13 between the beam 5 and the forward end of the tail board 10 prior to rigidly securing of these parts together.

Rigid with and depending from the beam 5 in advance of the standards 6 and the blade 7 are a plurality of spaced shoes 14 having forwardly curved surfaces adapted to engage the ground when the weeder is bodily tilted forwardly whereby rolling movement of the weeder upon the ground may be had to effect raising of the blade 7 whereby the latter may be dis-engaged from the ground and positioned at a required elevation for convenient cleaning of the blade should the same become clogged when in use. The shoes 14 preferably consist of longitudinally curved strips of stiff metal suitably fixed by bolting or the like at their upper ends to the underside of the beam 5. As shown, a pair of the shoes 14 is employed, one shoe being attached to the beam 5 adjacent each end of the latter. These shoes terminate at their lower ends above the plane of the blade 7 so that in the normal use of the weeder the shoes are dis-engaged from and elevated above the ground.

In operation, the weeder is bodily drawn ahead with an attendant standing upon the tail board 10 so that his weight partially offsets the tendency of the weeder to bodily tilt forwardly while being so pulled, the lighter the weight of the attendant, the nearer to the rear end of the tail board, he should stand. The weeder is thus forwardly tilted, naturally, when pulled forwardly so that the blade 7 is positioned at a slight inclination as shown in Figures 2 and 3 for entering the soil and severing the stalks of the weeds slightly below the surface of the ground. Obviously, by suitable manœuvring and up and down movement upon the tail board 10, the attendant may vary the depth at which the blade is allowed to pass beneath the surface of the soil, as desired and governed by the circumstances or conditions met with in different uses of the weeder. Should the blade 7 become clogged by the adhering of dirt thereto or otherwise interfered with, the interruption in the operation of the weeder can be readily overcome by tilting the same forwardly so as to roll upon the shoes 14 and thereby cause the blade 7 to be withdrawn from and elevated above the ground.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:—

1. In a weeder structure of the character described, a plurality of standards of substantially J-shaped design arranged in spaced side-by-side relation, a cutting blade extending across and secured to the bill portions of said standards, a beam extending across the shank portions of said standards adjacent the free ends of the same and secured thereto, a plurality of spaced curved shoes secured to said beam and extending rearwardly therebeneath between said standards, and a hitch eye formed at the free end of the shank of the end ones of said standards, substantially as and for the purpose described.

2. In a weeder structure of the character described, a plurality of standards of substantially J-shaped design arranged in spaced side-by-side relation, a cutting blade extending across and secured to the bill portions of said standards, a beam extending across the shank portions of said standards adjacent the free ends of the same and secured thereto, a plurality of spaced curved shoes secured to said beam and extending rearwardly therebeneath between said standards, a hitch eye formed at the free end of the shank of the end ones of said standards, substantially as and for the purpose described, the shank portions of said standards being normally inclined forwardly and downwardly, and a counter balance beam extending rearwardly from the central portion of said first mentioned beam and normally arranged in a horizontal position.

In testimony whereof I affix my signature.

THURVAL CARLSEN.